(12) United States Patent
McKinney

(10) Patent No.: US 8,510,430 B2
(45) Date of Patent: Aug. 13, 2013

(54) INTELLIGENT PERFORMANCE MONITORING BASED ON RESOURCE THRESHOLD

(75) Inventor: Howard Milton McKinney, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1905 days.

(21) Appl. No.: 11/462,209

(22) Filed: Aug. 3, 2006

(65) Prior Publication Data

US 2008/0034082 A1    Feb. 7, 2008

(51) Int. Cl.
*G06F 15/177* (2006.01)

(52) U.S. Cl.
USPC .......................................... 709/224; 709/223

(58) Field of Classification Search
USPC .................................. 709/224, 223
See application file for complete search history.

(56) References Cited

U.S. PATENT DOCUMENTS

| | | | |
|---|---|---|---|
| 5,974,457 A * | 10/1999 | Waclawsky et al. | 709/224 |
| 6,026,440 A | 2/2000 | Shrader et al. | |
| 6,457,143 B1 | 9/2002 | Yue | |
| 6,513,065 B1 * | 1/2003 | Hafez et al. | 709/224 |
| 6,553,403 B1 | 4/2003 | Jarriel et al. | |
| 6,959,264 B2 | 10/2005 | Mandal | |
| 6,993,453 B2 | 1/2006 | Krissell | |
| 7,225,250 B1 * | 5/2007 | Harrop | 709/224 |
| 7,249,179 B1 * | 7/2007 | Romero et al. | 709/226 |
| 7,631,073 B2 * | 12/2009 | Chagoly et al. | 709/224 |
| 7,702,783 B2 * | 4/2010 | McKinney | 709/224 |
| 2004/0054695 A1 | 3/2004 | Hind et al. | |
| 2004/0054984 A1 | 3/2004 | Chong et al. | |
| 2004/0068560 A1 | 4/2004 | Oulu et al. | |
| 2005/0251804 A1 | 11/2005 | Musta et al. | |
| 2005/0273593 A1 | 12/2005 | Seminaro et al. | |
| 2006/0168199 A1 * | 7/2006 | Chagoly et al. | 709/224 |
| 2007/0011300 A1 * | 1/2007 | Hollebeek et al. | 709/224 |
| 2008/0097801 A1 * | 4/2008 | MacLellan et al. | 705/7 |

FOREIGN PATENT DOCUMENTS

CN        1508739 A        6/2004

* cited by examiner

*Primary Examiner* — Kenneth R Coulter
(74) *Attorney, Agent, or Firm* — Yee & Associates, P.C.; Jeffrey S. LaBaw

(57) ABSTRACT

A computer implemented method, data processing system, and computer program product for selective monitoring of individual transactions in an instrumented software application. In response to receiving a new transaction at an entry point, a monitoring policy is checked to determine if the monitoring policy indicates that the transaction should be monitored. If the monitoring policy indicates that the transaction should be monitored, a determination is made as to whether the system resources are operating at a predetermined system condition defined in the monitoring policy. If the system resources are operating at the predetermined system condition, the transaction will be monitored. If the system resources are not operating at the predetermined system condition, the transaction will not be monitored.

18 Claims, 3 Drawing Sheets

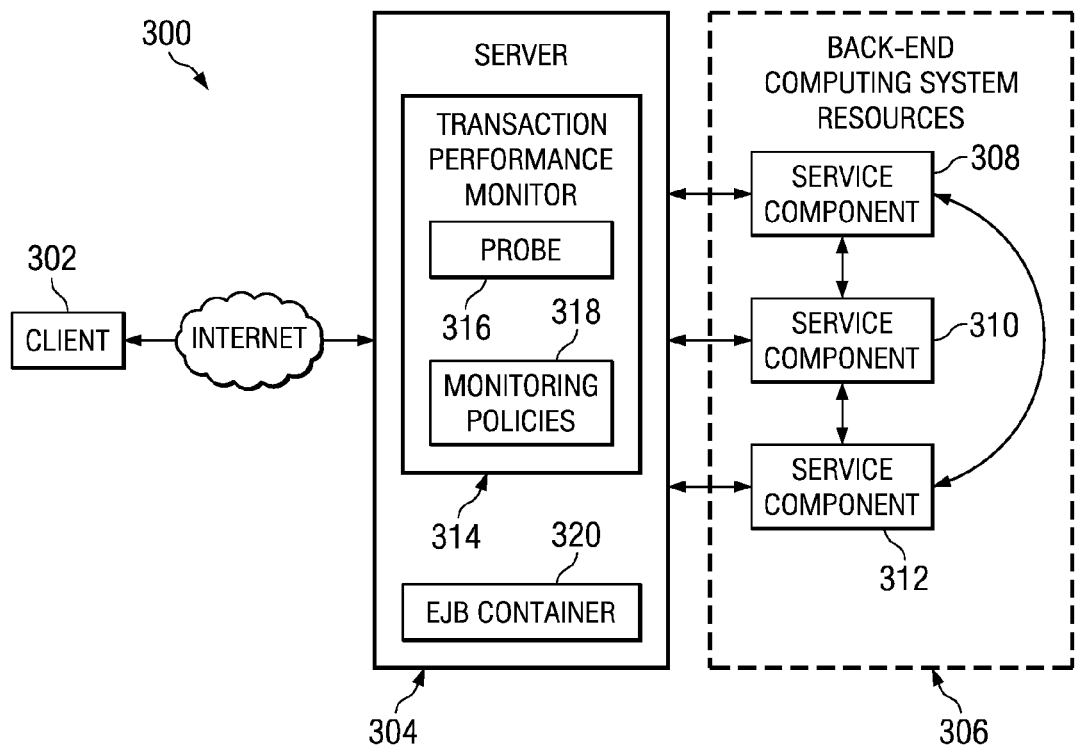
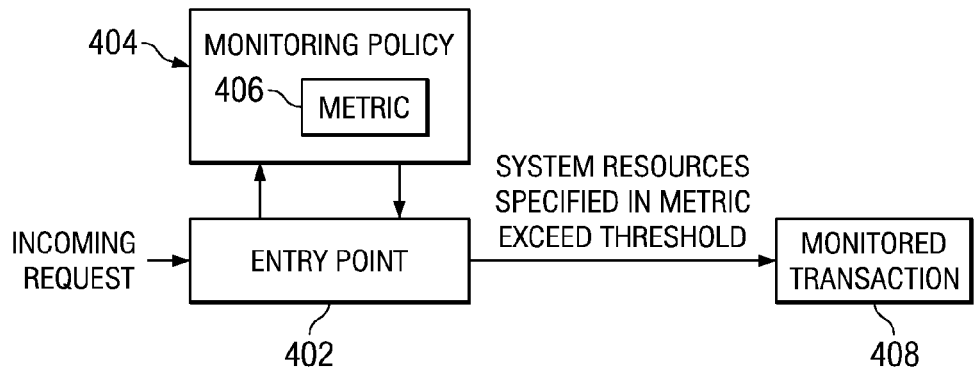

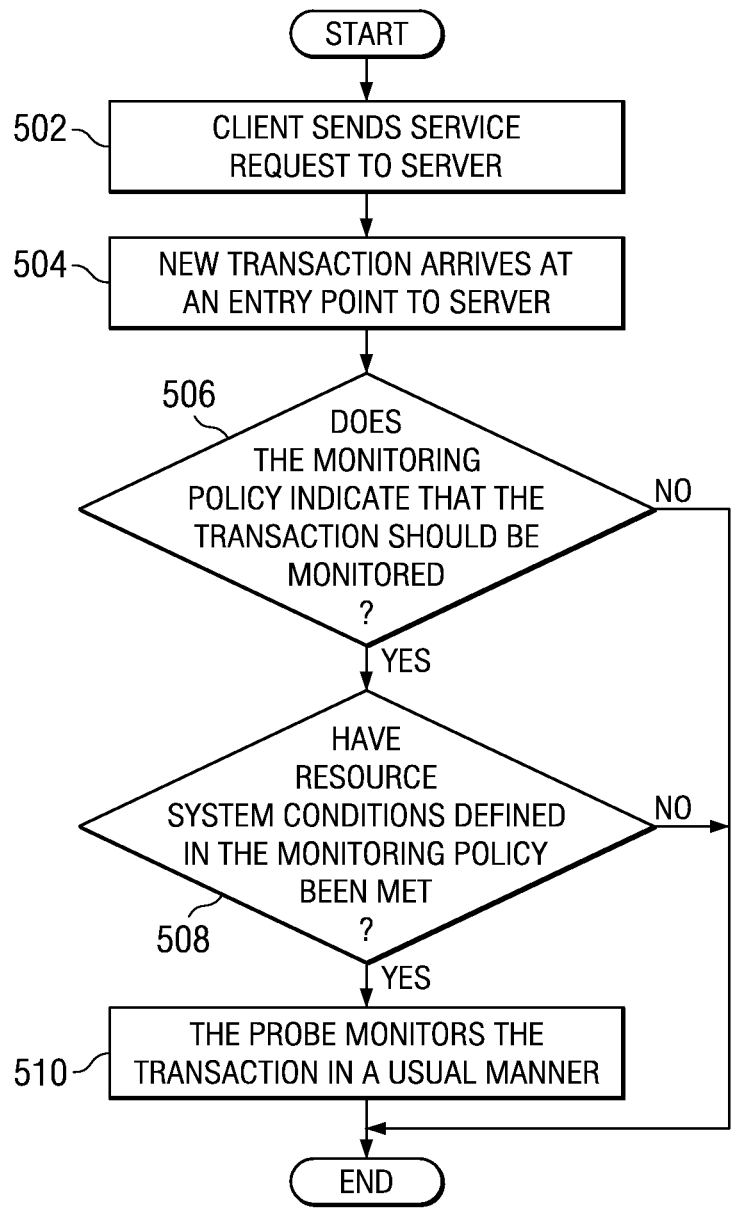

INTELLIGENT PERFORMANCE MONITORING BASED ON RESOURCE THRESHOLD

BACKGROUND OF THE INVENTION

1. Field of the Invention

The present invention relates generally to an improved data processing system for monitoring software performance, and in particular, to selective monitoring of individual transactions in an instrumented software application.

2. Description of the Related Art

Performance monitoring is often used in optimizing the use of software in a system. A performance monitor is generally regarded as a facility incorporated into a processor to assist in analyzing selected characteristics of a system by determining the state of a machine at a particular point in time. One method of monitoring system performance is to monitor the system using a transactional-based view. In this manner, the performance monitor may access the end user experience by tracking the execution path of a transaction to locate where problems occur. Thus, the experience of the end user is taken into account in determining if the system is providing the service needed.

A key task in system administration is to monitor the performance and availability of software applications, including those that may spread across multiple physical systems involving multiple physical resources. Typically, this monitoring is performed by instrumenting the software to include additional instructions, called "probes," to report performance information, such as application response time. Performance monitoring may also be implemented in an enterprise by adding an additional software component, sometimes called a plug-in, to the application that is invoked in line during the execution of the transaction. Since the monitoring is performed in real time, any such monitoring causes some degree of run time performance overhead on the monitored systems. Thus, it is important to provide a control mechanism to configure the monitoring activity at an adequate granularity.

There are currently two main approaches for controlling performance overhead. The first approach includes selectively turning the monitoring on or off based upon the application or logic component. For example, when a user initiates a transaction from a Web browser, the request is sent to a Web server, which in turn makes a call to an application server and a database server. Traditionally, if the user has experienced a performance problem, the entire application that runs on the Web server, the application server, and the database server would be monitored in order to pinpoint the root cause of the problem. However, there are two major drawbacks to this application-based approach. When transaction monitoring is enabled for an application, all business transactions in that application will be monitored, regardless of whether or not they are relevant to identify the performance bottleneck. This all-inclusive monitoring incurs more overhead in terms of CPU usage, memory, etc., than necessary to solve the problem. In addition, when transaction monitoring is enabled for an application, every transaction in the application will generate additional monitoring information at the same level. The accumulated data volume can become very high within a short period of time, thus incurring additional overhead to process the data.

The second approach for controlling performance overhead is to have each business transaction associated with a "token" that embeds the entire monitoring configuration that should be used for the individual transaction. This approach is disclosed in U.S. patent application Ser. No. 10/971,472 now U.S. Pat. No. 7,552,212, titled "INTELLIGENT PERFORMANCE MONITORING BASED ON USER TRANSACTIONS", and filed on Oct. 22, 2004. Each instrumented application has an entry point for requests (business transactions) to be monitored. Once these entry points are defined for the application, monitoring policies are associated with those entry points. The monitoring policy is represented as a token, which embeds all information necessary to monitor the transaction. However, a drawback to this approach is that there is no other control mechanism for deciding when the transaction should be monitored, other than a predefined sampling rate. This lack of control is problematic because anomalies in the system could occur during business transactions that are not being monitored.

SUMMARY OF THE INVENTION

The illustrative embodiments provide a computer implemented method, data processing system, and computer program product for selective monitoring of transactions in an instrumented software application. In response to receiving a new transaction at an entry point, a monitoring policy is checked to determine if the monitoring policy indicates that the transaction should be monitored. If the monitoring policy indicates that the transaction should be monitored, a determination is made as to whether the system resources are operating at a predetermined system condition defined in the monitoring policy. If the system resources are operating at the predetermined system condition, the transaction will be monitored. If the system resources are not operating at the predetermined system condition, the transaction will not be monitored.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a block diagram of exemplary components used to selectively monitor individual transactions in accordance with the illustrative embodiments;

FIG. 4 is a block diagram illustrating use of a metric in the monitoring policy to identify transactions to monitor in accordance with the illustrative embodiments; and FIG. 5 is a flowchart of a process for selective monitoring individual transactions in an instrumented software application in accordance with the illustrative embodiments.

DETAILED DESCRIPTION OF THE PREFERRED EMBODIMENT

Figure 1:
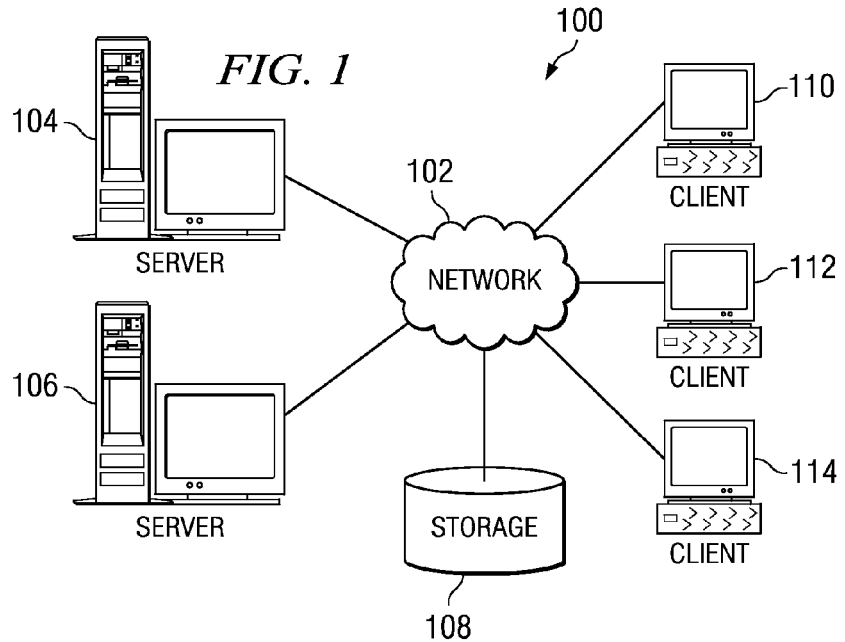
FIG. 1 depicts a pictorial representation of a distributed data processing system in which aspects of the present invention may be implemented.
Figure 2:
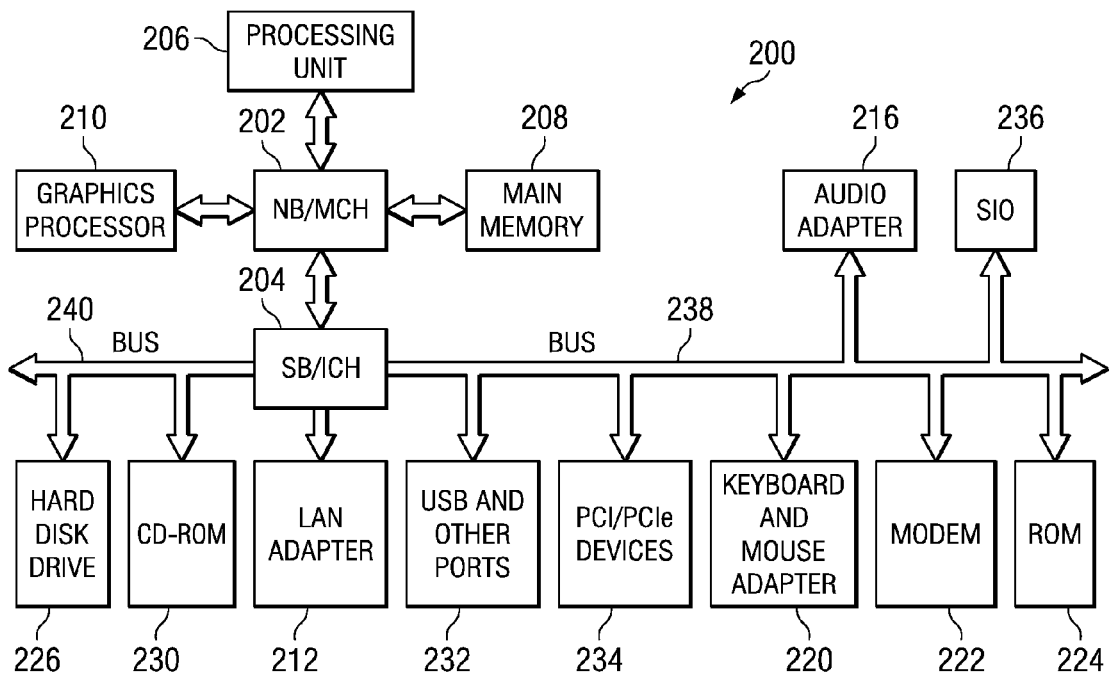
FIG. 2 is a block diagram of a data processing system in which aspects of the present invention may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

One or more servers, such as server 104 in FIG. 1, may provide Web services of an electronic business for access by client devices, such as clients 108, 110 and 112. In the illustrative embodiments, a transaction performance monitoring system is provided for monitoring performance of components of a server and its enterprise back-end systems in order to provide data representative of the enterprise business' performance in handling transactions. In one exemplary embodiment, this transaction performance monitoring system is IBN® Tivoli Monitoring for Transaction Performance For Response Time Tracking (ITCAMfRTT) which measures and compiles transaction performance data including transaction processing times for various components within the enterprise system, error messages generated, and the like.

ITCAMfRTT is a centrally managed suite of software components that monitor the availability and performance of Web-based services and operating system applications. ITCAMfRTT captures detailed transaction and application performance data for all electronic business transactions. With ITCAMfRTT, every step of a customer transaction as it passes through an array of hosts, systems, applications, Web and proxy servers, Web application servers, middleware, database management software, and legacy back-office software, may be monitored and performance characteristic data compiled and stored in a data repository for historical analysis and long-term planning. ITCAMfRTT allows an electronic business owner to effectively measure how users experience the electronic business under different conditions and at different times. Most importantly, the electronic business owner may isolate the source of performance and availability problems as they occur so that these problems can be corrected before they produce expensive outages and lost revenue.

Transactions are computer operations that are initiated by a user, and these user transactions may be composed of downstream sub-transactions. For example, when a user logs on to Amazon.com to buy a book, the user has initiated a transaction. The original request is, for example, sent to a Web server and then to an application server such as a Java server. The transaction may further invoke database operations in the form of sub-transactions. Transactions may also include the chain of sub-transactions initiated by the original user request. Such user requests may be made, for example, from a Web browser.

Each instrumented application has entry points for requests or transactions that should be monitored. An entry point, or edge transaction, is the first location in the system where a transaction is recorded by the monitoring application. For example, a Web application server may satisfy Web page requests, and the request may be defined as a Uniform Resource Locator (URL). A Web server plug-in that is listening for incoming HTTP requests may identify this URL and detect if the URL matches a given monitoring policy. Alternatively, a probe that has been inserted into an instrumented Java application server may intercept all servlet requests and identify the incoming HTTP request and URL in a similar fashion. If the identified URL matches a given monitoring policy, it is recorded as a transaction and used to represent the entry point into the monitored application. Other possible entry points include transactions over Web Services, Remote Method Invocation (RMI), Java Database Connectivity (JDBC), Java Connection Architecture (JCA), Java Message Service (JMS), .NET, shell scripts, etc. Thus, each instrumented application must have an entry point for requests to be monitored (i.e. a Servlet, EJB, etc). The entry point is defined in the application monitoring policy. Monitoring policies may include policies that monitor every transaction that arrives on the server or monitoring selected transactions by specifying the particular URLs of the transactions to be monitored.

While existing systems allow an administrator to define an entry point in an application monitoring policy to specify the point at which a transaction will be monitored, the illustrative embodiments improve upon these existing monitoring policies by enabling individual transactions in an instrumented software application to be monitored at a more granular level. The application monitoring policy in the illustrative embodiments include a metric which controls if a transaction should be monitored, and if so, when the monitoring should begin. The metric is defined by the administrator and may include a description of various system resources already monitored on systems where the transaction will traverse. For example, such monitored system resources may include, but are not limited to, the amount of free virtual memory on a given server, CPU utilization, current Enterprise JavaBeans (EJB) buffer pool size, or current thread pool size. The metric in the application monitoring policy may also define predetermined system conditions within which the monitored resource may operate. A predetermined system condition is any condition that may negatively affect the performance of a transaction when the transaction traverses the resource. For example, if a monitored resource is operating at a predetermined system condition, such as operating above an acceptable threshold level defined in the monitoring policy, the metric may specify that the transaction should be monitored. Conversely, if the monitored resource is not operating within the predetermined system condition, the transaction will not be monitored. Thus, while the metric in the application monitoring policy specifies that the CPU utilization of a server traversed by the transaction should be monitored, the metric may also further specify that the monitoring should only occur when that CPU utilization is operating at the predetermined system condition, such as by meeting or exceeding a limit or threshold level. Other examples of predetermined system conditions include, but are not limited to, a server being down, an application being unavailable or constrained, an application being at the wrong version, a database being locked, etc. Thus, the defined metric in the application monitoring policy provides an administrator with another dimension of control in performance monitoring, and may be used to reduce the overhead of the actual transaction monitoring.

FIG. 3 is a block diagram of exemplary components used to selectively monitor individual transactions in a distributed computing system 300 in accordance with the illustrative embodiments. Client 302 is an example of a client, such as clients 108, 110, and 112 in FIG. 1. Server 304 is an application server, such as server 104 in FIG. 1, and may function as a combined Web server/application server. A typical application server is J2EE-based, running EJBs or other Java components. EJB components encapsulate business rules and other functions in session beans, entity beans, and message-driven beans. Client 302 communicates with server 304 in order to obtain access to services provided by the back-end enterprise computing system resources 306.

In this example, client 302 sends a request to server 304, which causes a transaction to be created. The request may take many forms, including, but not limited to, HTTP, Web services, EJB, or JMS requests. Server 304 acts as an intermediary between the client request and the application components that need to run to provide the requested service. In response to receiving the client request, server 304 parses the request to obtain the URL. The URL is used to establish a Web service identity by reference. Based upon the URL, server 304 may identify the service or services that should be run in order to perform the client request.

Server 304 processes the transaction by invoking the appropriate service component to service the request, such as service components 308, 310, or 312. Service components may include application servers, Web servers, database servers, or any other back-end system being serviced. In addition, transaction performance monitoring system 314 monitors server 304 and back-end computing system resources 306 as they process the transactions. This performance monitoring involves collecting and storing data regarding performance parameters of the various components of server 304 and back-end computing system resources 306. For example, monitoring of performance may involve collecting and storing information regarding the amount of time a particular component spends processing the transaction, the bit rate of the component, an SQL query, component information including class name and instance ID in the JAVA Virtual Machine (JVM), memory usage statistics, any properties of the state of the JVM, properties of the components of the JVM, and/or properties of the system in general.

When a transaction arrives at a designated entry point to server 304, the presence of a monitoring probe inserted into the bytecode of server 304, such as probe 316, results in a determination whether the particular transaction is to be monitored. A probe is a program inserted at a key location in a network for the purpose of monitoring or collecting data about network activity. Probes are inserted into the bytecode of the running program on the server. Probes are inserted into many classes that are loaded into the Java Virtual Machine (JVM). These types of classes include, but are not limited to, classes that implement Enterprise Java Beans (EJBs), Servlet, Java Server Pages (JSPs), HTTP servers, Java Message Server (JMS), Java DataBase Connectivity (JDBC) and others.

Probe 316 makes the determination of whether the particular transaction is to be monitored by checking a monitoring policy associated with the entry point, such as monitoring policy 318, within server 304. An additional metric within monitoring policy 318 is used to describe various server resources that should be monitored, such as, for example, the amount of free virtual memory on a given server, CPU utilization, or current EJB buffer pool or thread pool size, on systems where the transaction will traverse. The metric may also further define the operation of the server resources by specifying a predetermined system condition, and if the predetermined system condition is met, the transaction will be monitored. If a resource is operating at the predetermined system condition, the resource may potentially experience a performance degradation and should be monitored. Thus, if the resource is not operating at the predetermined system condition, the transaction will not be monitored. Alternatively, if the resource is operating at the predetermined system condition, the transaction should be monitored according to the monitoring policy.

In one embodiment, resource information for a monitored server may be obtained using a program running outside of the monitored server, either installed on the same physical machine or running on a different machine, which generates a correlator used by the probe. For example, in Tivoli Monitoring for Transaction Performance For Response Time Tracking (ITCAMfRTT), the program is the Application Response Measurement (ARM) engine. When a new transaction arrives at the server, the probe fires and requests a correlator from the ARM engine. In this request, the probe provides the URL of the new transaction the ARM engine. If the URL matches a monitoring policy, and if the ARM engine determines that operation of a specified resource has met a predetermined system condition, then the ARM engine provides a correlator to the probe. The ARM engine itself may monitor the resource information to determine if a resource has met the predetermined system condition. Alternatively, an external resource monitoring program may monitor the resources and feed the resource condition data to the ARM engine.

Once the determination of whether the transaction should be monitored is made using the system resources information specified in monitoring policy 318, probe 316 returns this information to transaction performance monitoring system 314. If the information indicates that the transaction instance should not be monitored, transaction performance monitoring system 314 does not monitor the transaction. If the information indicates that the transaction instance should be monitored, probe 316 in transaction performance monitoring system 314 monitors the transaction in a typical fashion. In this manner, the bytecode inserted probes may dynamically determine whether a transaction should be monitored based on system resource information in a monitoring policy. The probes check the resource information defined in the monitoring policies to identify if a policy specifies that a server resource should be monitored based on the type of server resource and whether a pre-defined system condition of the resource has been met. Based on the resource information defined in the policy, the transaction performance monitoring system is allowed to dynamically include or exclude the transaction instance for monitoring. In other words, the system resource metric in the policy defines if the transaction should be recorded.

The components of server 304 and back-end computing system resources 306 may include both hardware and software components. For example, the components may include host systems, JAVA Server Pages, servlets, entity beans, Enterprise Java Beans, data connections, and the like. Each component may have its own set of performance characteristics which may be collected and stored by the transaction performance monitoring system 314 in order to obtain an indication as to how the enterprise system is handling transactions. Service components 308, 310, and 312 each contain all of the logic necessary to perform a specific function. The invocation of service components 308, 310, and 312 may occur through the use of Enterprise Java Bean (EJB) container 320. As illustrated, service components 308, 310, or 312 may also receive a request from a parent component (when the service component is itself not the root service). Service components 308, 310, or 312 interpret the request, perform the desired function, and send a reply to server 304. This reply is then delivered to client 302.

FIG. 4 depicts an exemplary use of the system resource metric in a monitoring policy in a transaction in accordance with the illustrative embodiments. The instrumentation or probe monitors the entry point 402 in the application. When execution of a transaction reaches entry point 402, the probe is executed in line with the transaction and the probe checks monitoring policy 404. Monitoring policy 404 maintains a defined list of one or more monitoring policies. Monitoring policy 404 attempts to match all key parameters in the incoming request in order to uniquely match the transaction with a defined monitoring policy. Once the transaction is matched with a defined monitoring policy, the probe checks the defined monitoring policy to determine whether the transaction should or should not be monitored. The defined monitoring policy contains an additional metric, such as metric 406, which comprises system resource information defined by an administrator. Based on the description in the additional metric in the monitoring policy, the probe may monitor transaction 408 if the policy criteria are met. For instance, if the transaction will traverse a particular system resource, that resource is checked by the probe to determine if the resource is currently operating predetermined system condition, such as at a level exceeding a given threshold. If the resource is currently operating at the predetermined system condition, the probe will monitor the transaction. If the resource is not operating at the predetermined system condition, the probe does not monitor the transaction. Thus, using the additional system resources metric in the monitoring policy provides an administrator with another dimension of control in monitoring transactions. Since the illustrative embodiments allow for selectively monitoring transactions, the computational overhead associated with monitoring transactions may be minimized and the amount of data generated by transaction monitoring may be reduced.

FIG. 5 is a flowchart of a process for selective monitoring of individual transactions in an instrumented software application in accordance with the illustrative embodiments. The process depicted in FIG. 5 may be implemented in a data processing system, such as server 304 in FIG. 3. The process begins with a client sending a request for a service to a server (step 502). The new transaction arrives at an entry point ("edge") to the server (step 504). In the server, a monitoring probe checks the monitoring policy to determine if this transaction should be monitored (step 506). The monitoring policy may include a metric which defines various system resources which are monitored on the systems where the transaction will traverse.

If the monitoring policy indicates that this transaction instance should not be monitored ("no" output of step 506), the particular transaction instance is not monitored, and the process terminates thereafter. If the monitoring policy indicates that this transaction instance should be monitored ("yes" output of step 506), the monitoring probe makes a determination whether the resource system conditions (if any) defined in the monitoring policy have been met at the instant that the transaction arrived at the server (step 508). If the monitoring probe determines that no resource system conditions have been met ("no" output of step 508), the particular transaction instance is not monitored, and the process terminates thereafter. If the monitoring probe determines that a predetermined system condition has been met ("yes" output of step 508), the probe monitors the transaction in a usual manner (step 510), with the process terminating thereafter. Since the system resource was determined to be operating at the predetermined system condition in the policy, the instrumented probe monitors the transaction since the transaction may potentially experience a performance degradation when the transaction traverses the resource.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for selectively monitoring, by a computer, transactions in a distributed computing system, the computer implemented method comprising:
    responsive to receiving a new transaction at an entry point, checking, by the computer, a monitoring policy to determine if the monitoring policy indicates that the new transaction that traverses a system resource identified in the monitoring policy should be monitored;
    responsive to determining that the new transaction should be monitored based on the identified system resource, determining whether the system resource traversed by the transaction is operating at a predetermined system condition defined in the monitoring policy;
    receiving monitoring information about the new transaction, wherein the new transaction is selectively monitored at the identified system resource if the system resource traversed by the transaction is operating at the predetermined system condition defined in the monitoring policy, and wherein the new transaction is allowed to continue as an unmonitored transaction if the system resource traversed by the transaction is not operating at the predetermined system condition.

2. The computer implemented method of claim 1, wherein determining whether the system resource is operating at the predetermined system condition defined in the monitoring policy further comprises:
    obtaining performance information for the system resource; and
    comparing the performance information against the predetermined system condition defined in the monitoring policy.

3. The computer implemented method of claim 2, wherein performance information is determined at a time the new transaction is received at the entry point.

4. The computer implemented method of claim 1, wherein the monitoring policy defines one or more system resources to be traversed by the transaction.

5. The computer implemented method of claim 1, wherein the predetermined system condition is a threshold level defined in the monitoring policy.

6. The computer implemented method of claim 1, wherein the system resource includes one of an amount of free virtual memory on a given server, CPU utilization, current Enterprise JavaBeans buffer pool size, or current thread pool size.

7. The computer implemented method of claim 1, wherein the system resources in the monitoring policy are defined by an administrator.

8. The computer implemented method of claim 1, wherein the monitoring policy is associated with an entry point in a system resource.

9. The computer implemented method of claim 1, wherein the monitoring policy indicates that the new transaction should be monitored based on a type of the system resource with an entry point in a system resource.

10. The computer implemented method of claim 1, wherein the new transaction is monitored if the system resource is operating at the predetermined system condition to record any performance degradation as the transaction traverses the system resource.

11. A data processing system for selectively monitoring transactions in a distributed computing system, the data processing system comprising:
    a bus;
    a storage device connected to the bus, wherein the storage device contains computer usable code;
    at least one managed device connected to the bus;
    a communications unit connected to the bus; and
    a processing unit connected to the bus, wherein the processing unit executes the computer usable code, in response to receiving a new transaction at an entry point, to check a monitoring policy to determine if the monitoring policy indicates that the new transaction that traverses a system resource identified in the monitoring policy should be monitored; determine, in response to determining that the new transaction should be monitored based on the identified system resource, whether the system resource traversed by the transaction is operating at a predetermined system condition defined in the monitoring policy; and receive monitoring information about the new transaction, wherein the new transaction is selectively monitored at the identified system resource if the system resource traversed by the transaction is operating at the predetermined system condition defined in the monitoring policy, and wherein the new transaction is allowed to continue as an unmonitored transaction if the system resource traversed by the transaction is not operating at the predetermined system condition.

12. The data processing system of claim 11, wherein the computer usable code to determine whether the system resource is operating at the predetermined system condition further comprises computer usable code to obtain performance information for the system resource and compare the performance information against the predetermined system condition defined in the monitoring policy.

13. The data processing system of claim 11, wherein the predetermined system condition is a threshold level defined in the monitoring policy.

14. A computer program product for selectively monitoring individual transactions in a distributed computing system, the computer program product comprising:
    a computer usable medium having computer usable program code stored thereon, the computer usable program code for execution by a computer, comprising:
    computer usable program code for checking, in response to receiving a new transaction at an entry point, a monitoring policy to determine if the monitoring policy indicates that the new transaction that traverses a system resource identified in the monitoring policy should be monitored;
    computer usable program code for determining, in response to determining that the new transaction should be monitored based on the identified system resource, whether the system resource traversed by the transaction is operating at a predetermined system condition defined in the monitoring policy;
    computer usable program code for receiving monitoring information about the new transaction, wherein the new transaction is selectively monitored at the identified system resource if the system resource traversed by the transaction is operating at the predetermined system condition defined in the monitoring policy, and wherein the new transaction is allowed to continue as an unmonitored transaction if the system resource traversed by the transaction is not operating at the predetermined system condition.

15. The computer program product of claim 14, wherein the computer usable program code for determining whether the system resource is operating at the predetermined system condition further comprises:
    computer usable program code for obtaining performance information for the system resource; and
    computer usable program code for comparing the performance information against the predetermined system condition defined in the monitoring policy.

16. The computer program product of claim 15, wherein performance information is determined at a time the transaction is received at the entry point.

17. The computer program product of claim 14, wherein the monitoring policy defines one or more system resources to be traversed by the transaction.

18. The computer program product of claim 14, wherein the predetermined system condition is a threshold level defined in the monitoring policy.

* * * * *